Figure 1B:
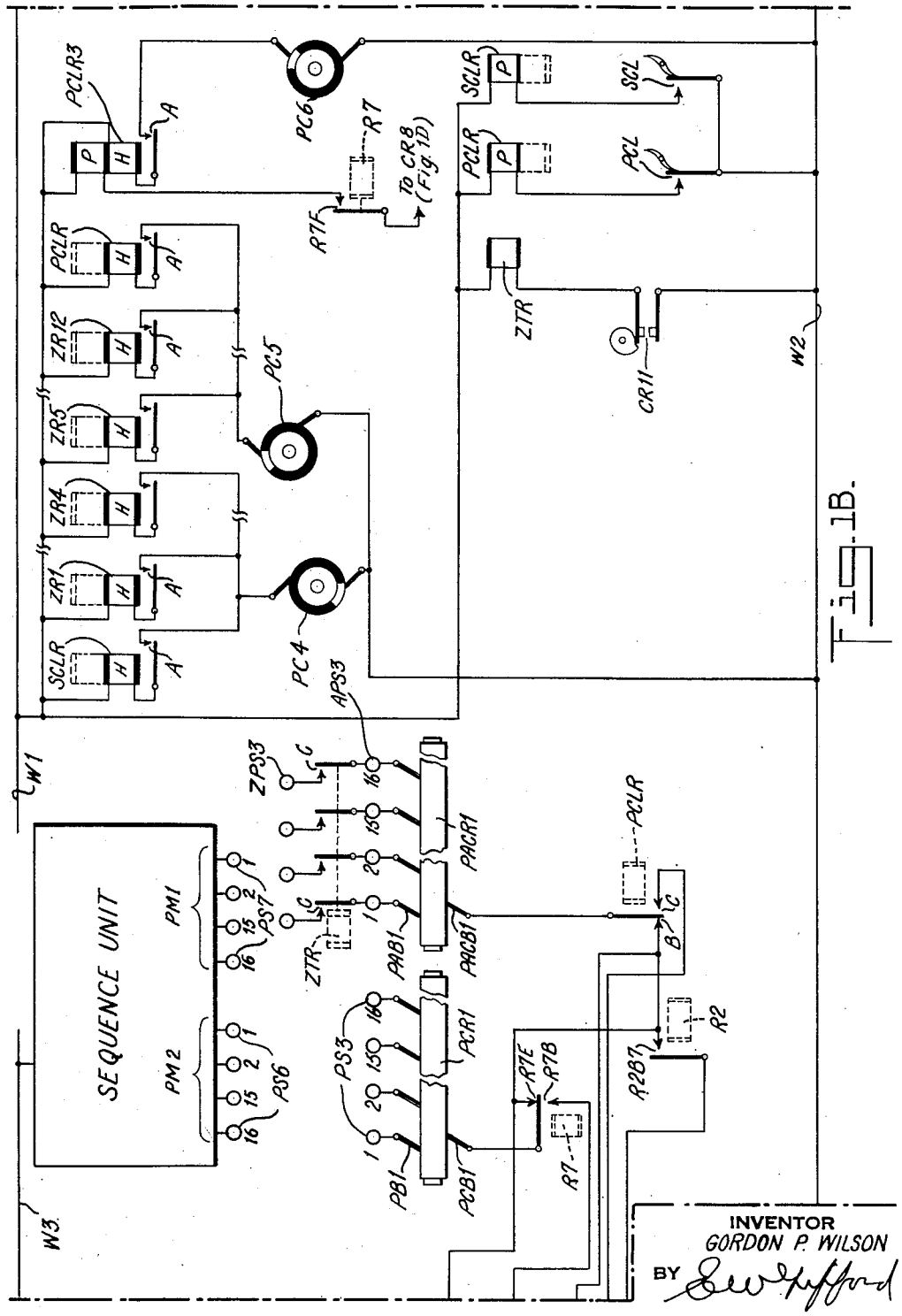
Figure 1C:
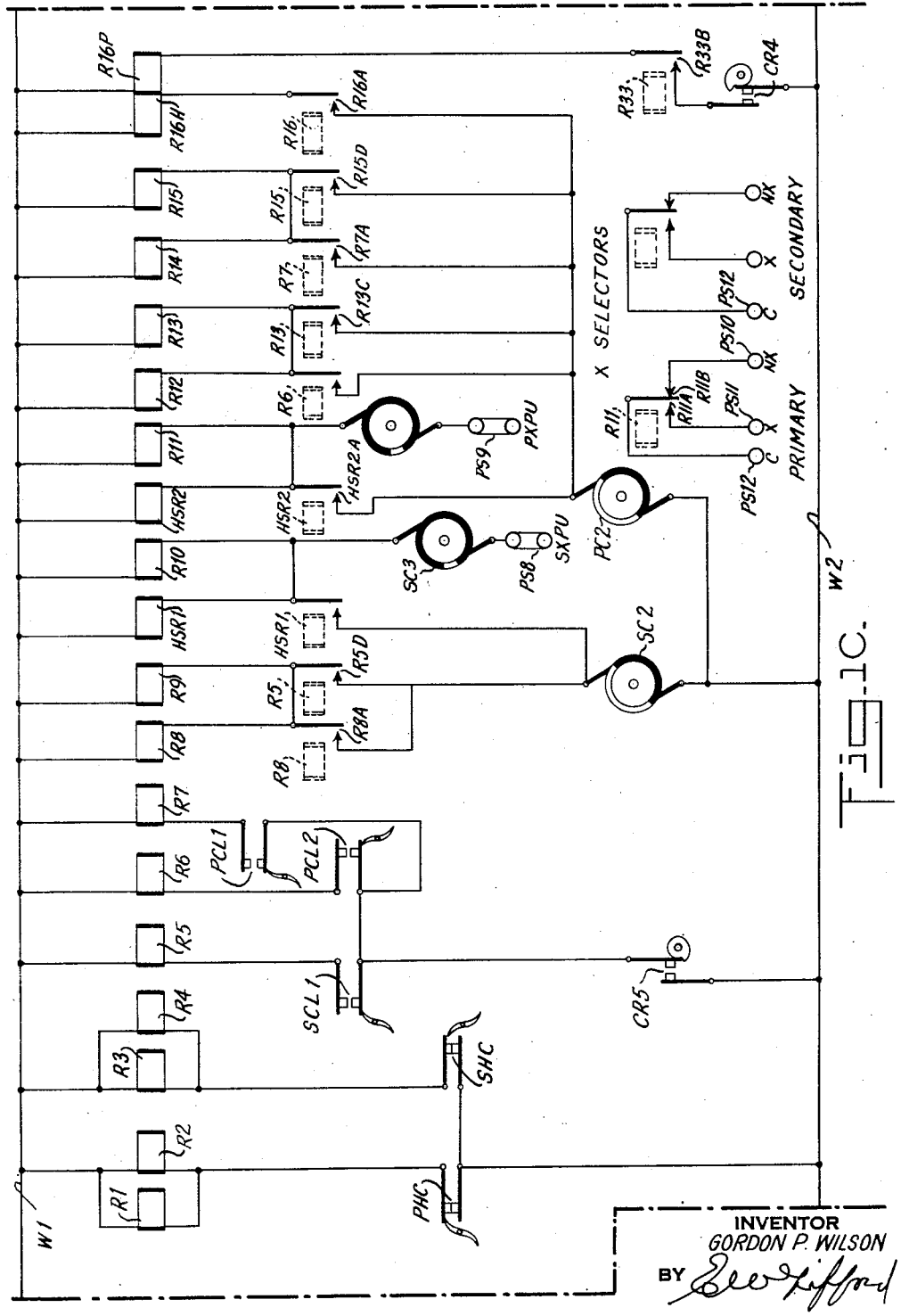

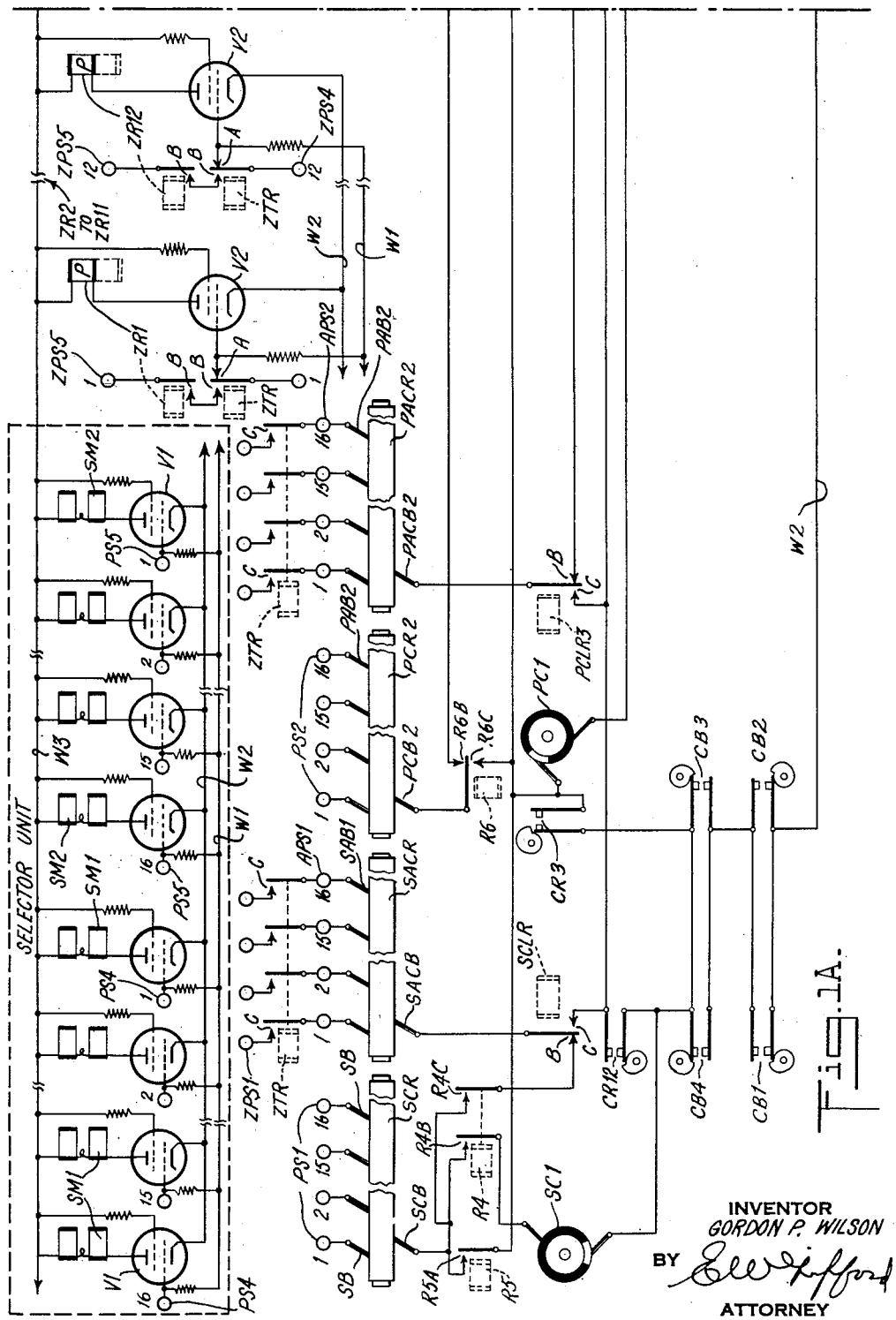

June 5, 1951     G. P. WILSON     2,555,774
RECORD COMPARING MECHANISM
Filed Oct. 28, 1949     8 Sheets-Sheet 2

INVENTOR
GORDON P. WILSON
BY
ATTORNEY

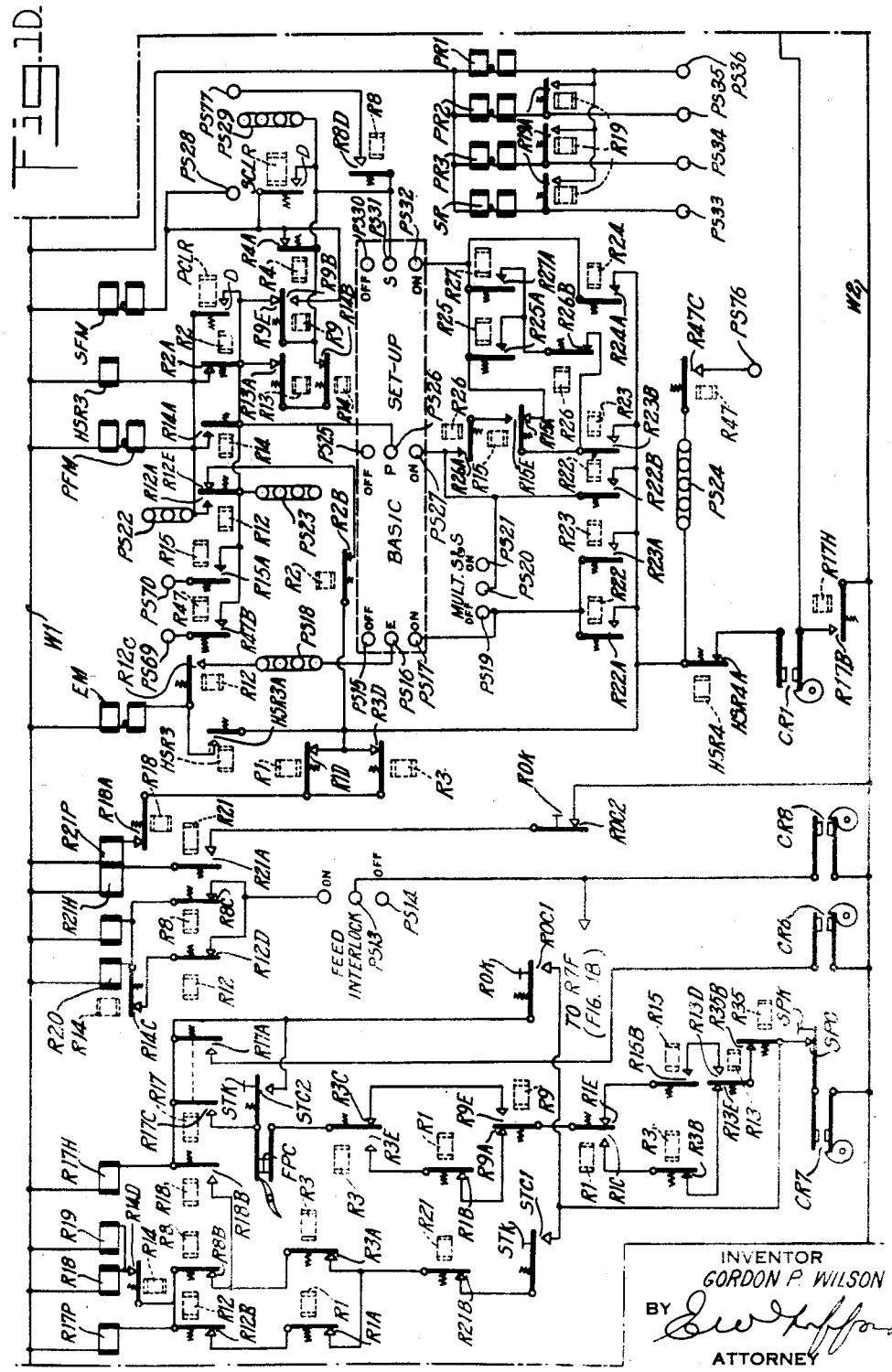

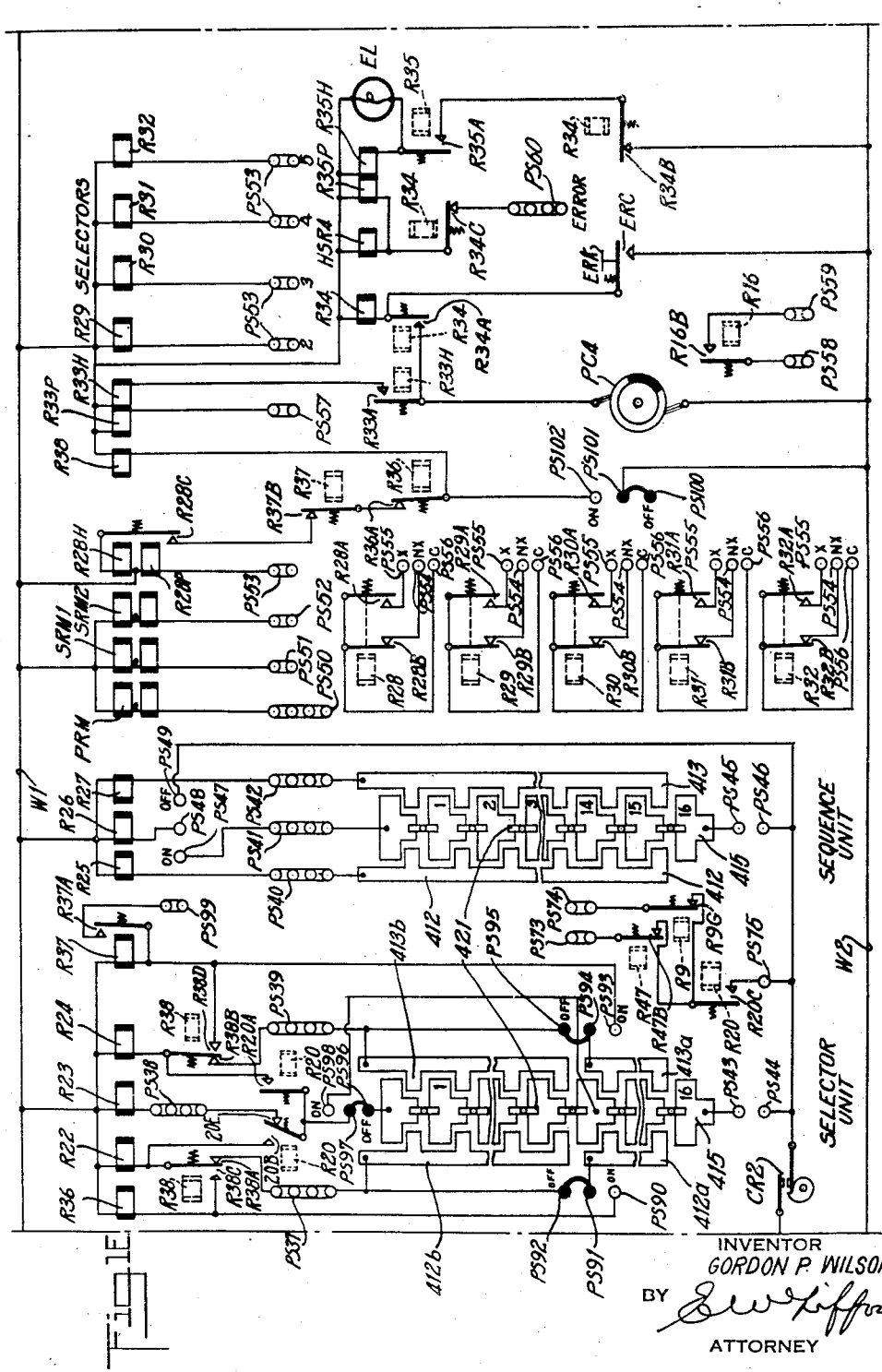

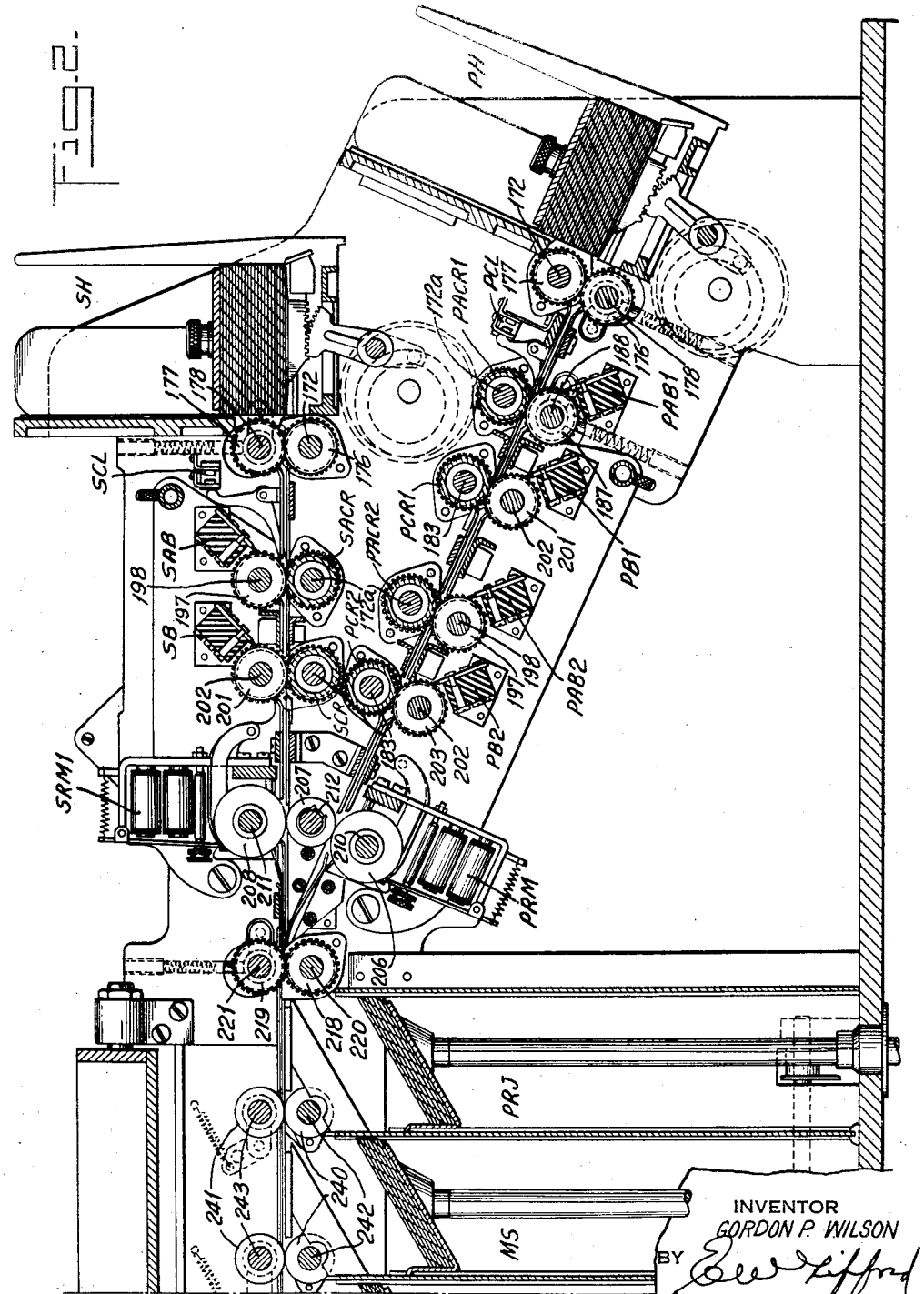

June 5, 1951    G. P. WILSON    2,555,774
RECORD COMPARING MECHANISM
Filed Oct. 28, 1949    8 Sheets-Sheet 7
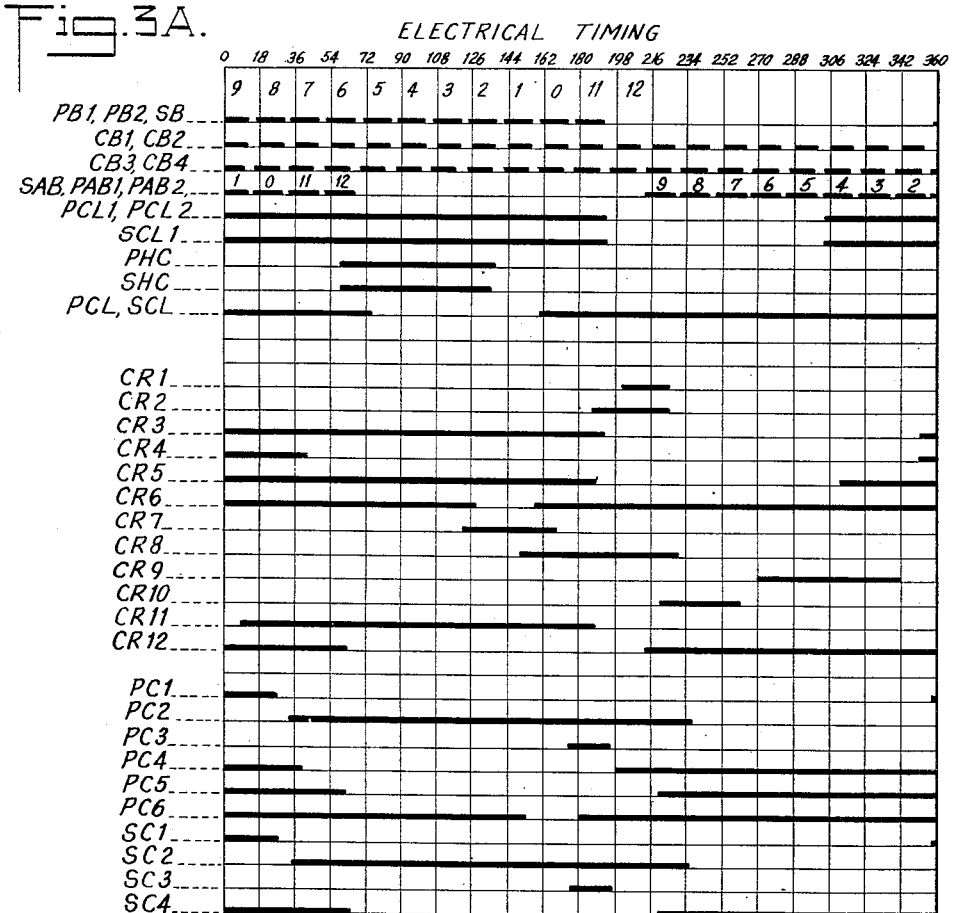
Fig. 3A. ELECTRICAL TIMING
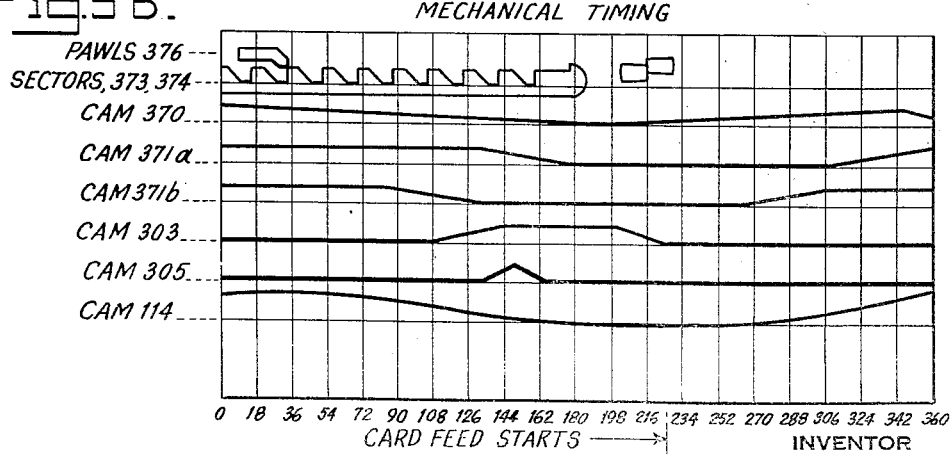
Fig. 3B. MECHANICAL TIMING
CARD FEED STARTS →
INVENTOR
GORDON P. WILSON
BY
ATTORNEY

Patented June 5, 1951  2,555,774

UNITED STATES PATENT OFFICE 2,555,774

RECORD COMPARING MECHANISM

Gordon P. Wilson, Johnson City, N. Y., assignor to International Business Machines Corporation, New York, N. Y., a corporation of New York Application October 28, 1949, Serial No. 124,067

8 Claims. (Cl. 235—61.7)

This invention relates to record controlled machines and more particularly to improvements in the machine disclosed in application Serial No. 758,732, filed July 3, 1947, by J. D. Hood.

The broad object of the present invention is to provide an improved record comparing mechanism for use in machines like the one disclosed in the above application.

Another object is to provide an improved comparing mechanism suitable for comparing accounting and statistical records which are alphabetically designated.

An object is to provide a comparing mechanism which is capable of comparing for sequence records in which either alphabetical or numerical designations are likely to appear in the columns of record fields under comparison.

A specific object is to provide a means of differentiating an alphabetical zero from a numerical zero in comparing accounting and statistical record cards in which both numerical and alphabetical data are likely to appear in the same columns.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1A to 1E comprise a wiring diagram of the machine.

Fig. 2 comprises a vertical section through approximately one-half of the machine to show the card hoppers, card feeding mechanism, and card sensing mechanism.

Figs. 3A and 3B together comprise a timing chart showing the electrical and mechanical timing, respectively, of the machine.

Figure 4:
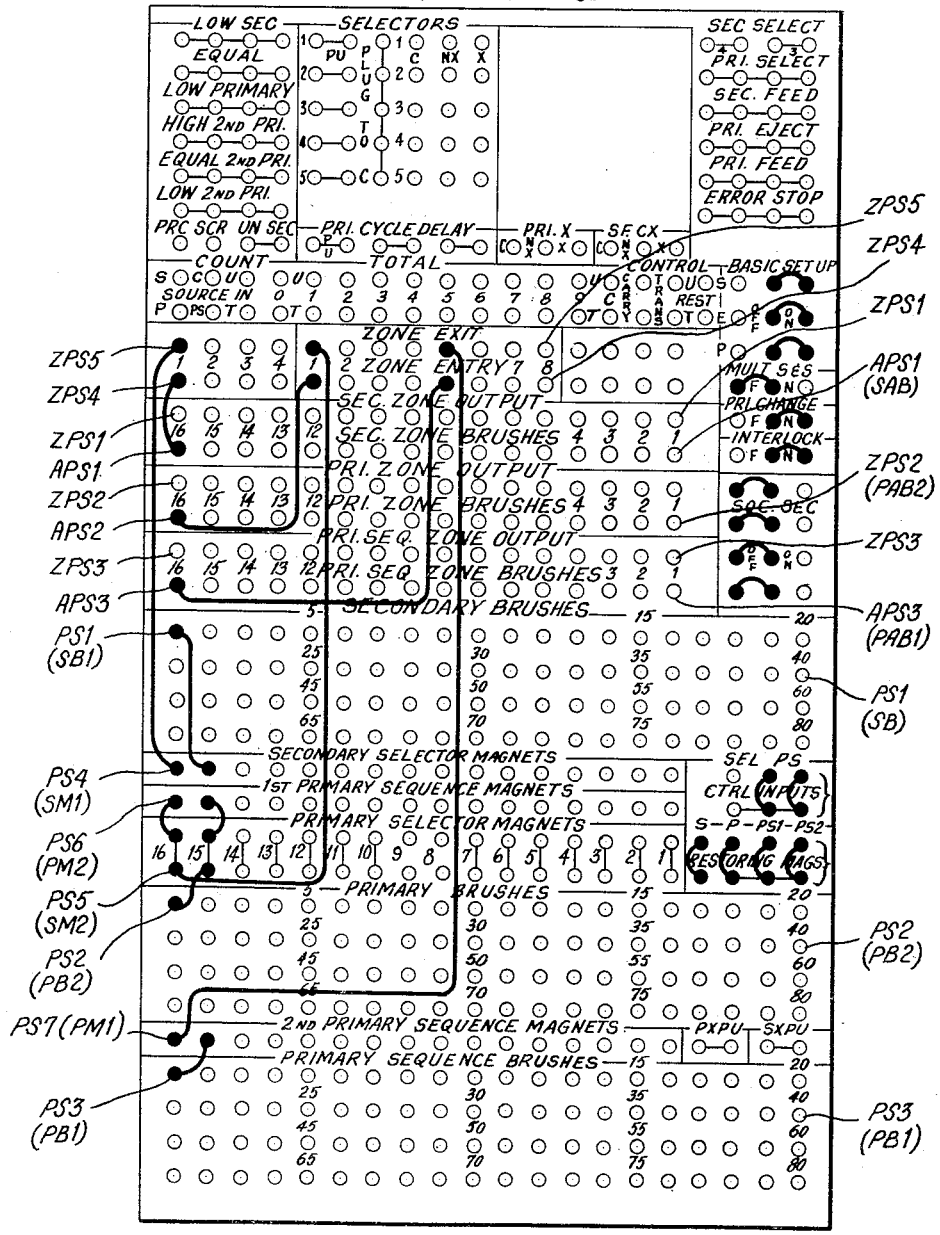

Fig. 4 is a plugboard diagram.

In the drawings, the invention is disclosed as applied to the well-known "IBM" alphabetic collator which is constructed substantially as shown in Patent 2,379,828 as modified by the alphabetical comparing circuits disclosed in the above application. It will be understood that the comparing mechanism is not limited to use in the aforesaid machine, but, with the modifications in the circuits to enable alphabetical comparing to be effected, may be applied to other machines in which it is desired to compare alphabetical or numerical data, or both.

One of the difficulties experienced with the comparing mechanism, as modified in the above application, arises from the use of two sets of sensing brushes at each sensing station, the machine of the aforesaid patent being provided with three sensing stations for sensing designations on one set of cards simultaneously with the concurrent sensing of the designations on two successive cards of another set. In the above application, each of the three sensing stations is provided with two sets of sensing brushes to enable the so-called "zone" hole positions, comprising the "0," "11," and "12" positions, to be sensed simultaneously with the sensing of the "8," "7," and "6" positions of the card.

So long as the comparing is confined to either alphabetic data alone or numerical data alone with respect to a particular column or columns, the machine functions properly. It occasionally happens, however, that cards may be designated either with purely numerical or purely alphabetical designations in certain columns and it is desired to compare the cards on the basis of a sequence scale which includes both alphabetical and numerical designations. This cannot be done with the circuits disclosed in the above application.

The reason for this characteristic is that if a card is punched with purely numerical designations and the machine is also set to compare alphabetical designations in the same column, a zero hole, which may be part of a designated number having a series of digits like the number "1001," for example, will be sensed twice, first by the alphabetical brushes designated SAB, PAB1, and PAB2, as in the aforesaid application, and thereafter will be sensed by the numerical brushes designated SB, PB1, and PB2. In the above application, the letters of the alphabet are automatically recoded as two-digit numbers in accordance with the following table:

| | | |
|---|---|---|
| A—12, 1—61 | J—11, 1—71 | S—0, 2—82 |
| B—12, 2—62 | K—11, 2—72 | T—0, 3—83 |
| C—12, 3—63 | L—11, 3—73 | U—0, 4—84 |
| D—12, 4—64 | M—11, 4—74 | V—0, 5—85 |
| E—12, 5—65 | N—11, 5—75 | W—0, 6—86 |
| F—12, 6—66 | O—11, 6—76 | X—0, 7—87 |
| G—12, 7—67 | P—11, 7—77 | Y—0, 8—88 |
| H—12, 8—68 | Q—11, 8—78 | Z—0, 9—89 |
| I—12, 9—69 | R—11, 9—79 | |

The zero hole will be sensed as a "0" by the main brushes SB, PB1, or PB2, and the comparing sector of the comparing unit will automatically take a zero setting and, when the zero hole is sensed by one of the alphabetical brushes SAB, PAB1, or PAB2, it is sensed as equivalent to "8" so that a single zero hole will be entered in two orders of the comparing unit as "80."

It will be noted from the above table that "80" lies between R and S, no such number being actually provided for in the coding of the alphabet; that is, there is no combination such as "8" and "0" and "8" and "1" in the alphabetic coding. Thus, from a sequential standpoint, such a card punched "0" would be treated as falling in sequence between R and S whereas it should precede the letter "A" as being lowest in sequence with respect to any letter and precede "1" with respect to a number.

Save for this one exception, the comparison of mixed alphabetic and numeric cards is possible and purely numerical cards or numbers will always be treated as lower in sequence than any alphabetic cards or letters. The reason for this is that in the above application, the recoded values of the "0," "11," and "12" holes are entered in orders of the comparing unit which are interspersed with the orders for the numerical holes with the "0," "11" and "12" holes for any particular column dominating in circuit testing sequence over the numerical holes. Since a card with a "0," "11," or "12" hole will set one of the comparing sector to one of the significant values "8," "7," or "6" whereas the numerical card will not affect this sector, the alphabetic card will be treated as highest in sequence, the basis of comparison being "8," "7," or "6" with zero. Thus, the card or column which is numerical will always be treated as lowest in sequence in comparison with an alphabetic card or column.

The purpose of the present invention is to provide a means for preventing a card which is punched with a zero hole alone in a given column from effecting an entry into the order of the comparing unit which receives recoded entries for "0," "11," and "12" holes for such column. This effect is partly accomplished by presensing all of the holes at the alphabetical brushes to determine if the zero hole in any card is accomplished by a hole in the "1" to "9" positions. If such is the case, it signifies that the card is either purely a numerical card punched with the significant digits "1" to "9," or an alphabetical card comprising a combination of "0," "11," or "12" with the perforations "1" to "9." As there are no combinations comprising "0" with "11" or "12," if the card is punched zero alone, it signifies that the card is purely numerical in respect to that particular column and entries into the comparing order for the "0," "11," and "12" holes should be suppressed.

In the above application, the sensing of the holes by the alphabetical brushes, is restricted by the timing contacts CR12 (Fig. 1A) so that entries can only be made at "8," "7," and "6" from the "0," "11," and "12" holes. In the present case, the contacts CR12 have been retimed (Fig. 3A) to close at approximately 214° and open at approximately 62° of each cycle. A "9" hole, if present, will pass the alphabetical brushes SAB, PAB1, PAB2 at approximately 216° of the cycle so that the values "1" to "9" punched in any column render a circuit effective with respect to that column to permit the "0," "11," and "12" holes for the same column, if any, to be entered into the proper order of the comparing unit.

Since the functioning of the machine in general is the same as in the aforesaid patent and application, only a very brief outline of the construction of the machine and its operation will be given.

With reference to Fig. 2, the machine comprises two card hoppers, one of which is designated SH for the so-called secondary cards, and the other is designated PH for the so-called primary cards. From these hoppers, the cards are transported to the left by suitable feed rollers which in Fig. 2 are designated to correspond with the patent, past the secondary alphabetical brushes SAB and the secondary brushes SB, in the case of the secondary cards, and the two sets of primary brushes PAB1, PB1, PAB2, PB2. During such passage, entries are made in the comparing units comprising the selector unit and sequence units, respectively, in the manner described in said patent and patent application, respectively.

In the machine as disclosed herein, the entries in the two comparing units are not made directly as in the above patent and application, but are controlled by electronic tubes designated V1 in the drawings, of which there are provided sixty-four, one for each of the sixty-four comparing magnets SM1, SM2, PM1, PM2. The tubes V1 are wired in a conventional manner with the magnets SM1, SM2, PM1, PM2 in the plate circuits so that they are rendered effective when the tubes are made conducting. Only the first two and last two tubes for the two sections of the selector unit, the tubes associated with comparing orders or positions 1, 2, 15, and 16, are shown in Fig. 1A.

The grid of each tube V1 is connected to a plug socket PS4 or PS5 corresponding to similar plug sockets in the above patent and application for reception of the entries in the comparing units. The cathodes of all the tubes are connected to the line wire W2 which is connected to the positive of a 40-volt D. C. source of power, whereas the grids of the tubes are connected through suitable grid resistors to the line wire W1 which leads to the negative of the 40-volt D. C. source. The plate circuits, including the magnets SM1, SM2, PM1, PM2, are connected to the line wire W3 which in turn is connected to the positive of a 115-volt D. C. source of which the negative is connected to the wire W2. With this arrangement, the grids of the tubes V1 are normally maintained at a 40-volt negative potential which is sufficient to keep them non-conducting.

The plug sockets PS4, PS5 for the selector unit inputs and the plug sockets PS6, PS7 for the sequence unit inputs may be plugged directly to the card sensing brushes in the same general manner described in the above application by means of the plug sockets PS1, PS2, PS3 and the alphabetic "Zone output" ZPS1, plug sockets ZPS2, ZPS3 (Figs. 1A, 1B, and 4). Simple numerical and simple alphabetical comparing may be effected in one or more of the various types of operation described in the above patent in which card comparison is involved, such as matching and merging operations. Under these conditions the machine functions exactly as described in the above patent application. The functioning of the machine is only modified in such cases by the fact that the magnets SM1, SM2, PM1, and PM2 are energized under control of the tubes V1, instead of being directly energized by impulses from the brushes.

For the moment, let it be assumed that the brush SB for column 1 (Fig. 1A) corresponding to plug socket PS1 for column 1, is plugged to the plug socket PS4 to control the position 15 magnet SM1 of the selector unit. The record sensing brushes are all connected through various contacts to the line wire W2 which, it will be recalled, is connected to the positive of the 40-volt D. C. source, whereas the control grids of the tubes V1 are connected to the wire W1 which in turn is connected to the 40-volt negative. The second tube V1 from the left, which is selected for illustration, will be in a non-conducting condition, due to the fact that the control grid thereof is maintained at a 40-volt negative potential, relative to the cathode. As soon as an impulse is emitted from the contact roll SCR, due to the brush SB for column 1 finding a hole in the card, the plug socket PS4 will be connected to the line wire W2, thereby connecting the control grid of the position 15 tube V1 to the cathode, reducing the grid to zero potential relative to the cathode and rendering the tube V1 current conducting. This causes the position 15 magnet SM1 to be energized and renders the corresponding comparing sector effective to take a position determined by the value of the perforation sensed by the brush for column 1, exactly as in the above patent.

For the purpose of effecting simple alphabetic comparison in column 1, for instance, the plug socket PS4 (Fig. 1A) for position 16 will be plugged to plug socket ZPS1 for column 1; the plug socket PS4 for position 15 will be plugged to the plug socket PS1 for column 1, following the teachings of the above application, to effect control of two adjacent comparing orders or positions of the selector unit by alphabetic perforations in another column similarly plugged to the corresponding positions 15 and 16 corresponding to primary selector magnets SM2. Ordinarily, this latter plugging would be to the plug sockets ZPS2, PS2 for column 1, for the purpose of comparing primary and secondary cards in column 1.

So long as this comparing operation is kept either strictly numerical or strictly alphabetical and there is no possibility that a 0 may occur alone, the comparison may be effected correctly.

The means for preventing the treatment of a numerical 0 as an alphabetical O comprises an electronic control unit which, in conjunction with the alphabetical brushes SAB, PAB1, PAB2 determines the fact that, besides the 0 in a given column, there is also one of the values 1 to 9. This unit includes a series of twelve electronic tubes V2 (Fig. 1A) which are arranged similarly to the tubes V1 insofar as the components of the tubes are concerned, that is, the tubes V2 have their grids connected to line wire W1, their cathodes to line wire W2, and their plate circuits to the line wire W3.

The plate circuits of tubes V2 include the zone relays ZR1 to ZR12 which are double coil relays having the pick-up or P coils in the plate circuits of the tubes V2 (Fig. 1A) while their hold coils H are shown in Fig. 1B in series with the hold contacts A of such relays and the commutators SC4, PC5. The control unit comprising the twelve relays ZR1 to ZR12 has twelve input plug sockets ZPS4 and twelve output plug sockets ZPS5 which in Fig. 4 are captioned "Zone entry" and "Zone exit," respectively, on the plugboard. The zone entry plug sockets ZPS4 are normally electrically connected to the grids of the tubes V2 through the normally closed contacts A of the zone transfer relay ZTR. For present purposes this relay may be considered as a single multi-contact relay which has its coil ZTR (Fig. 1C) in series with the timing contacts CR11 which close once per cycle to energize the relay ZTR.

The contacts CR11 (Fig. 3A) are closed at approximately 9° of the cycle and open at approximately 187° of the cycle. Thus, the contacts A of relay ZTR normally are closed during the period in which the alphabetical or zone brushes SAB, PAB1, PAB2 are sensing the "1" to "9" positions of the card columns. Due to the displacement of these latter brushes from the main or numerical brushes SB, PB1, PB2, the "9" holes will be sensed by the alphabetic or zone brushes at approximately 216° and the "1" holes at approximately 360° of the cycle.

The relays ZR1 to ZR12 have contacts B (Fig. 1A) which are in series with the contacts B of relays ZTR between the input plug sockets ZPS4 and the output plug sockets ZPS5, each relay controlling a single set of contacts B. The relay ZTR also has a series of contacts C, each of which connects one of the alphabetic brushes to one of the plug sockets ZPS1, ZPS2, ZPS3, which on the plugboard (Fig. 4) are designated as "Secondary zone output," "Primary zone output," and "Primary sequence zone output," respectively. The secondary commutator SC4 controls the first four relays designated ZR1 to ZR4 which are used in conjunction with the secondary side of the selector unit whenever cards in the secondary feed are being compared with cards in the primary feed. The remaining eight relays ZR5 to ZR12 may be used in conjunction with the relays ZR1 to ZR4 or may be used when an operation like sequence checking is involved in which only the primary feed is in operation.

In order to understand how the circuits operate when either alphabetic and numeric designations are likely to occur in a card column, it will be assumed that positions 15 and 16 of the selector unit have been plugged in the general manner described in the above application so that position 16 receives the zone values and position 15 the numerical values of column 1 in the card. However, instead of plugging the position 16 plug socket PS4 directly to plug socket APS1 as in the above application, it will be plugged to zone exit plug socket ZPS5 for position 1 of the control unit and plug socket ZPS4 for control unit position 1 will be plugged to plug socket APS1 for column 1. Fig. 4 illustrates the plugging of column 1 for a simple merging operation involving the use of both comparing units.

Let it be assumed that a card is punched zero alone in column 1. The zero will be sensed by the column 1 brush SAB at "8" in the cycle in which the card passes the brushes SB, due to the fact that the brushes SAB are spaced from the brushes SB so that a zero sensed by brush SAB ordinarily will be treated as if it were an "8" sensed by brush SB. It will be noted in Fig. 3A that contacts CR11 close at approximately 9° and energize relay ZTR, before a zero hole can be sensed by the brushes SAB. This closes the contacts B of relay ZTR (Fig. 1A) and opens the contacts A of the same relay, thereby preventing the zero hole from having any effect on the tube V2. Thus relay ZR1 is not energized and contacts B thereof remain open, preventing closure of a circuit between the plug sockets ZPS4, ZPS5 for position 1 of the control unit. Thus, if a zero alone is sensed, the relay ZTR transfers before the zero can be sensed by the brush SAB and no entry of "8" will be made in position 16 of the selector unit. Since the card is punched zero alone in column 1, the sector for position 15 will automatically go to zero position so that the comparing sectors for positions 15 and 16 on the secondary side of the selector unit will both go to 0. Thus, the numerical zero will also be treated as an alphabetical zero (a blank column) on the secondary side of the selector unit.

Now let it be assumed that the card is punched "9" and "0" in column 1, corresponding to the letter "Z." The "9" in column 1 will be sensed by brush SAB at approximately 216° of the cycle since at this time relay ZTR is deenergized and all its contacts A are closed. The position 1 tube V2 will be rendered current-conducting in the same manner as the tubes V1 by a circuit which may be partially traced from the contact roll SACR, which is live in this point of the cycle, through the brush SAB for column 1, the plug wire between column 1 plug socket APS1 and the position 1 plug socket ZPS4, and the grid resistor for position 1 tube V2, to the line wire W1. This reduces the potential on the grid of the tube V2 to cathode potential, rendering the tube conducting, thereby energizing relay ZR1 which closes its contacts B. Contacts A of relay ZR1 (Fig. 1B) close to establish a holding circuit for the hold coil H of this relay across the line wires W1, W2 through the commutator SC4. This commutator is driven by the secondary feed mechanism and holds the relay ZR1 energized until "5" in the next cycle. During the next cycle, when the card passes the brushes SB, the "9" hole will be sensed at "9" by the column 1 brush SB and "9" will be entered in position 15 of the comparing unit through the plug wire between plug sockets PS1, PS4. The contacts CR11 close just before 9 in this same cycle and energize the relay ZTR which closes its contacts B in preparation for sensing of the "0" "11," and "12" holes concurrently with sensing of the "8," "7," and "6" positions of column 1 by brush SB.

At "8" in the same cycle, the zero hole in column 1 will be sensed by the brush SAB and a circuit will be established from the contact roller SACR, the brush SAB, the plug wire between plug sockets APS1 and ZPS4, contacts B of relays ZTR, ZR1, the plug wire between the plug socket ZPS5 and the plug socket PS4 for position 16, to the grid of tube V1 for position 16, thereby causing the energization of the magnet SM1 which effects the entry of the value "8" in the selector unit in the usual way.

Both numerical and alphabetical data are not likely to appear in all of the columns of an alphabetical field or a group of separated alphabetical columns which, for control purposes, may be treated as one field. Consequently, in the illustrative machine, provision has been made in the control unit for only four control positions for each of the three sets of brushes in the machine. However, it will be understood that the number of relays ZR1 to ZR2 may be increased and the number of contacts C of relay ZTR may be correspondingly increased up to the total number of brushes in the machine, if it were necessary for maximum flexibility. In the drawings, the contacts C are shown as permanently connected to the alphabetic brushes for columns 1 to 16, but it is plain that they may be connected to any other brushes as desired or, as stated, the number of contacts may be increased to provide every brush in each set of alphabetic brushes with a pair of contacts C and a plug socket ZPS1, ZPS2, or ZPS3.

In the machine disclosed in the above patent and application, the card lever contacts PCL, SCL control circuits disclosed in Fig. 1D, ordinarily being in parallel with the contacts R2A and R4A, respectively. In the present case, these card levers have been reconnected to control the primary card lever relay PCLR and the secondary card lever relay SCLR, these relays having contacts D which replace the contacts PCL, SCL in Fig. 1D. The relays SCLR, PCLR each have the contacts B and C in Figs. 1A and 1B which take the place of the card lever relay contacts R5F, R5G in 1A and R7F, R7G in Fig. 1B of the above application. The card lever relay R7 (Fig. 1C) has a contact R7F (Fig. 1B) which controls the card lever relay PCLR3 through the contacts CR8 (Fig. 1D). The energization of the card lever R7 closes a circuit to the pick-up coil P of relay PCLR3 (Fig. 1B) and the hold coil H thereof is held energized through the contacts PC6. The relay PCLR3 has the contacts B and C (Fig. 1A) which replace the card lever contacts R6E, R6F in the above application. Aside from these changes and the addition of the electronic tubes V1 and contacts SC4, PC5, the basic machine is fundamentally unchanged over the disclosure of the above application and patent.

It should be remarked that because of the necessity for sensing the entire card column by the alphabetic brushes, the usual variable speed drive, which forms the subject matter of Patent 2,174,705, has been removed on account of the fact that the speed variations above and below the normal speed would occur during the sensing of the values "2" to "9" by brushes SAB, PAB1, PAB2 so that the time between index-point positions is now uniform during this part of the cycle. Owing to the necessity for sensing the card in this manner and the removal of the variable speed drive, the relative timing of the machine is very slightly changed but the sequential operation of the circuits is the same so that the operation of the machine for any of the conventional operations disclosed in the patent remains the same.

The machine is plugged as first described herein to the plug sockets ZPS1, ZPS2, ZPS3 when simple alphabetic comparing is being effected. The relay ZTR is energized during the sensing of the "8" to "11" positions by brushes SB, PB1, PB2 in the first half of the cycle. However, the contacts CR12 open between "5" and "6" in the cycle. Since CR11 are open from "12" in one cycle to "9" in the next cycle, the next effect is to prevent entries of values other than "8," "7," and "6," corresponding to the "0," "11," and "12" holes. This simplifies the plugging for alphabetic comparing as it makes it unnecessary to use the control unit except when either numerical or alphabetic data are likely to appear in a column.

The input plug sockets ZPS4 of the control unit are plugged to the alphabetic brushes only for those columns in which either alphabetic or numerical designations may appear. The alphabetic brushes for the remaining columns are plugged from plug sockets ZPS1, ZPS2, or ZPS3 to plug sockets PS4, PS5, PS6, PS7. For example, if there happened to be only one column in a field of 8 columns in which either numbers or letters might be designated, let us say the fourth column, input position 1 plug socket ZPS4 of the control unit will be plugged to the column 4 plug socket APS1 to render such position operative. Position 5 plug socket ZPS4 of the control unit will be plugged to the plug socket APS2 for column 4. The output plug sockets ZPS5 for positions 1 and 5 will be plugged to the position 7 plug sockets PS4 and PS5, respectively. All of the remaining plug sockets ZPS1, ZPS2 except the ones for column 4 will be plugged directly to the plug sockets PS4, PS5 for orders 1, 3, 5, 9, 11, 13, and 15 which receive the zone entries.

It will be noted in Fig. 4 that, while there are four sets of comparing magnets, it is only necessary to provide a single set of four relays in the group ZR5 to ZR12 for the magnets SM2 and PM1 since the values sensed by the primary brushes and the brushes PB2 are normally entered in one side of both comparing units in the manner explained in the above patent and application and it is convenient to effect the split by plugging to the double plug sockets PS5 (Fig. 4) from the control unit plug socket ZPS5 and then plugging from these plug sockets to plug sockets PS6 for the first primary sequence magnets.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a comparing mechanism for machines controlled by records in which alphabetic data is recorded by means of combinations of two designations, one selectively disposed in ten numerical index-point positions including a zero position and the other selectively disposed in one of a plurality of alphabetic zonal index-point positions including said zero position, said machine having both numerical sensing elements for sensing said numerical positions and alphabetic sensing elements for sensing the numerical designations prior to sensing the alphabetic zonal designations, said comparing mechanism having means for separately receiving entries of values representing said numerical and zonal designations; the combination of means to normally suppress entries of the alphabetic zonal values in the receiving means under control of the alphabetic sensing elements, and means controlled by the alphabetic sensing elements for rendering the suppressing means ineffective when a numerical value is designated to enable zonal values to be entered in the receiving means if designated in the record.

2. In a comparing mechanism for machines controlled by records in which alphabetic data is recorded by means of combinations of two designations, one selectively disposed in ten numerical index-point positions including a zero position and the other selectively disposed in one of a plurality of alphabetic zonal index-point positions including said zero position, said machine having both numerical sensing elements for sensing said numerical positions and alphabetic sensing elements for sensing the numerical designations prior to sensing the alphabetic zonal designations, said comparing mechanism having means for separately receiving entries of values representing said numerical and zonal designations; the combination of means responsive to the sensing of a numerical designation of significant value by said alphabetic sensing elements for potentially placing the receiving means under control of the alphabetic sensing elements, and means responsive to the sensing of zonal designations for entering the zonal values in the receiving means.

3. In a comparing mechanism for machines controlled by records in which alphabetic data is recorded by means of combinations of two designations, one selectively disposed in ten numerical index-point positions including a zero position and the other selectively disposed in one of a plurality of alphabetic zonal index-point positions including said zero position, said machine having both numerical sensing elements for sensing said numerical positions and alphabetic sensing elements for sensing the numerical designations prior to sensing the alphabetic zonal designations, said comparing mechanism having means for separately receiving entries of values representing said numerical and zonal designations; the combination of means controlled by said alphabetic sensing elements for differentiating numerical zero designations from alphabetic zonal designations, and means controlled by said differentiating means for rendering the receiving means operative only when a numerical designation occurs in combination with a zonal designation.

4. In a comparing mechanism for machines controlled by records in which alphabetic data is recorded by means of combinations of two designations, one selectively disposed in ten numerical index-point positions including a zero position and the other selectively disposed in one of a plurality of alphabetic zonal index-point positions including said zero position, said machine having both numerical sensing elements for sensing said numerical positions and alphabetic sensing elements for sensing the numerical designations prior to sensing the alphabetic zonal designations, said comparing mechanism having means for separately receiving entries of values representing said numerical and zonal designations; the combination of means to limit entries in the receiving means under control of the alphabetic sensing elements to the zonal values, and means controlled by the alphabetic sensing elements for disabling the limiting means when a significant numerical value designation is sensed in combination with a zonal value designation.

5. In a comparing mechanism for machines controlled by records in which alphabetic data is recorded by means of combinations of two designations, one selectively disposed in ten numerical index-point positions including a zero position and the other selectively disposed in one of a plurality of alphabetic zonal index-point positions including said zero position, said machine having both numerical sensing elements for sensing said numerical positions and alphabetic sensing elements for sensing the numerical designations prior to sensing the alphabetic zonal designations, said comparing mechanism having means for separately receiving entries of values representing said numerical and zonal designations; the combination of means to differentiate a numerical zero designation from the combination of a numerical designation other than zero and a zero zonal designation and means controlled thereby for suppressing zero zonal value entries in the receiving means when a numerical zero designation is sensed.

6. In a comparing mechanism for machines controlled by records in which each alphabetic datum is recorded by means of a combination of two designations in a column of index-point positions, one designation being selectively disposed in one of ten positions including a numerical zero position, the other designation being selectively disposed in one of a series of zonal index-point positions including said zero position, said machine having a numerical electrical sensing device for closing circuits representing the numerical designations and a second electric sensing device for closing circuits representing all of said designations in advance of the sensing of the same designations by the first device, said comparing mechanism having a pair of entry controlling magnets, one controlled by said first device and the other for said second device; the combination of means for initially closing a comparing circuit from said second device to said second entry receiving magnet in response to the sensing of a numerical designation other than zero by said second device, and means to enable said second device to complete said circuit when a zonal designation which may be a zero designation is sensed by the second sensing device.

7. The invention set forth in claim 6 wherein the means for initially closing a circuit to the second magnet includes a relay having contacts connected to said second magnet, an electronic tube having at least a grid, cathode, and plate with said relay in the plate cathode circuit and said grid connected to said second device, and wherein the enabling means includes a switching device for connecting the second sensing device to said second magnet in cooperation through said relay contacts.

8. In a machine controlled by records in which data is recorded by means of designations in columns of index-point positions, each column having ten numerical positions including numerical zero and a plurality of zonal positions including said zero position, numerical data being recorded by selectively placing single designations in the numerical positions of each column, alphabetic data being recorded by combinations of single designations in said numerical positions other than zero position with single designations in said zonal positions, one of said columns being likely to contain either a numerical datum or an alphabetic datum, comparing means including separate comparing orders for the numerical designations and alphabetic zonal designations, means for sensing the numerical designations, means controlled by the comparing means for making entries in the numerical orders, means for sensing first the numerical and thereafter the zonal designations, means controlled by the second sensing means for entering in the alphabetic comparing orders values representative of the zonal positions, means to connect the second sensing means to the entering means for the alphabetic orders, and means controlled by the second sensing means for rendering the connecting means effective only when numerical designations occur in combination with zonal designations.

GORDON P. WILSON.

No references cited.